(12) United States Patent
Scott et al.

(10) Patent No.: US 8,434,692 B2
(45) Date of Patent: May 7, 2013

(54) FLOW DISTRIBUTION REGULATION ARRANGEMENT WITH BIMETALLIC ELEMENTS FOR ADJUSTING THE FLOW DISTRIBUTION IN A COOLING CHANNEL

(75) Inventors: Kevin Scott, Branston (GB); Peter Senior, Levittown, PA (US)

(73) Assignee: Siemens Aktiengesellschaft, München (DE)

( * ) Notice: Subject to any disclaimer, the term of this patent is extended or adjusted under 35 U.S.C. 154(b) by 825 days.

(21) Appl. No.: 12/520,142

(22) PCT Filed: Dec. 20, 2007

(86) PCT No.: PCT/EP2007/064347
§ 371 (c)(1),
(2), (4) Date: Dec. 2, 2009

(87) PCT Pub. No.: WO2008/077887
PCT Pub. Date: Jul. 3, 2008

(65) Prior Publication Data
US 2010/0089468 A1    Apr. 15, 2010

(30) Foreign Application Priority Data
Dec. 22, 2006    (EP) ..................... 06026683

(51) Int. Cl.
*G05D 23/02*    (2006.01)
*F28F 27/00*    (2006.01)
*F16K 15/00*    (2006.01)
*H05K 7/20*    (2006.01)

(52) U.S. Cl.
USPC ............. 236/93 R; 165/96; 361/704; 137/467

(58) Field of Classification Search ................ 236/93 R; 165/80.3, 96; 361/695, 704; 137/468, 873, 137/874; 415/12, 116
See application file for complete search history.

(56) References Cited

U.S. PATENT DOCUMENTS

| | | | |
|---|---|---|---|
| 2,673,687 A | 3/1954 | Alban et al. | |
| 2,763,433 A | 9/1956 | Hill | |
| 4,187,815 A * | 2/1980 | Kobayashi et al. | 123/548 |
| 4,245,778 A | 1/1981 | Diermayer | |
| 4,278,960 A * | 7/1981 | Muller et al. | 337/365 |
| 4,441,653 A | 4/1984 | Grudich | |
| 6,016,250 A * | 1/2000 | Hanners | 361/695 |
| 6,039,262 A | 3/2000 | DeAnna | |
| 6,330,157 B1 * | 12/2001 | Bezama et al. | 361/704 |

FOREIGN PATENT DOCUMENTS

| | | |
|---|---|---|
| DE | 1188612 B | 3/1965 |
| DE | 10225264 A1 | 4/2003 |
| DE | 10347335 A1 | 5/2005 |
| EP | 1462615 A1 | 9/2004 |
| FR | 1325086 A | 4/1963 |
| JP | 2004295718 A * | 10/2004 |
| SU | 726428 | 1/1980 |

* cited by examiner

*Primary Examiner* — Chen Wen Jiang

(57) ABSTRACT

A flow distribution regulation arrangement in a cooling channel is provided. The flow distribution regulation arrangement includes a plurality of bimetallic elements adapted to adjust a local flow of a cooling medium in the cooling channel in response to a heat load onto the bimetallic elements, wherein the heat load originates from local boundary sub areas of the cooling channel.

18 Claims, 7 Drawing Sheets

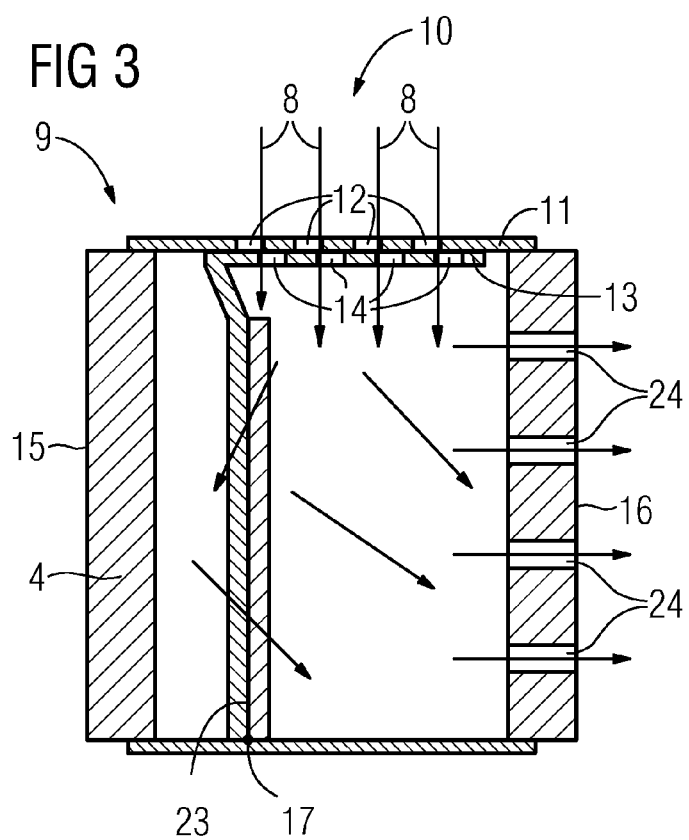
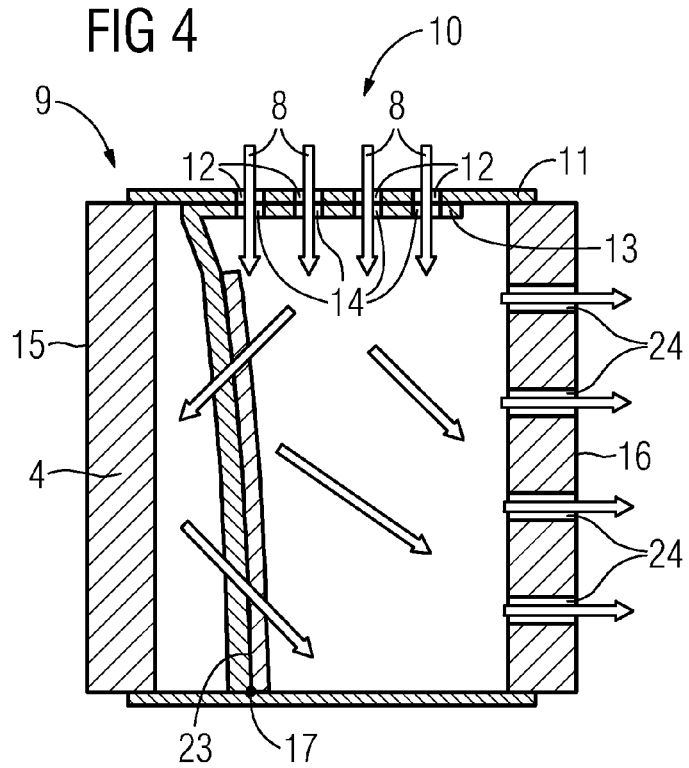

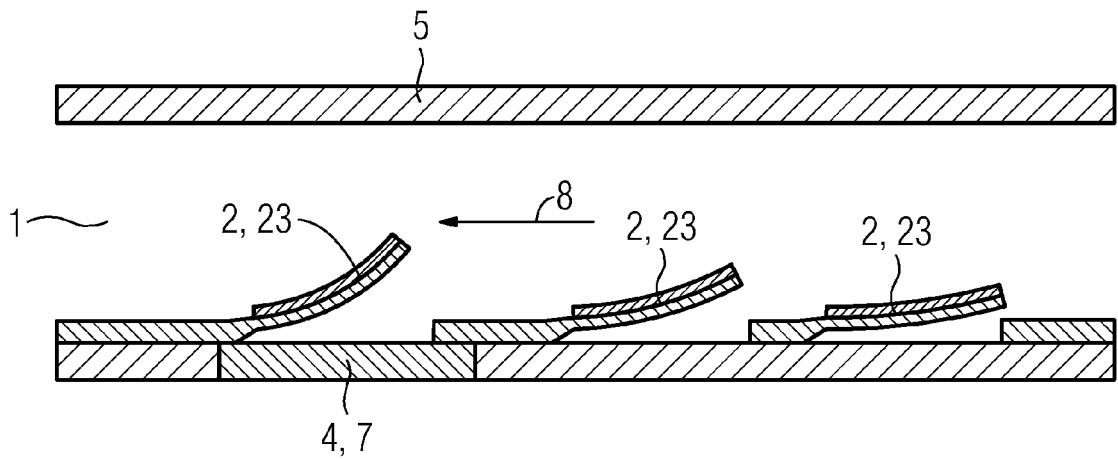
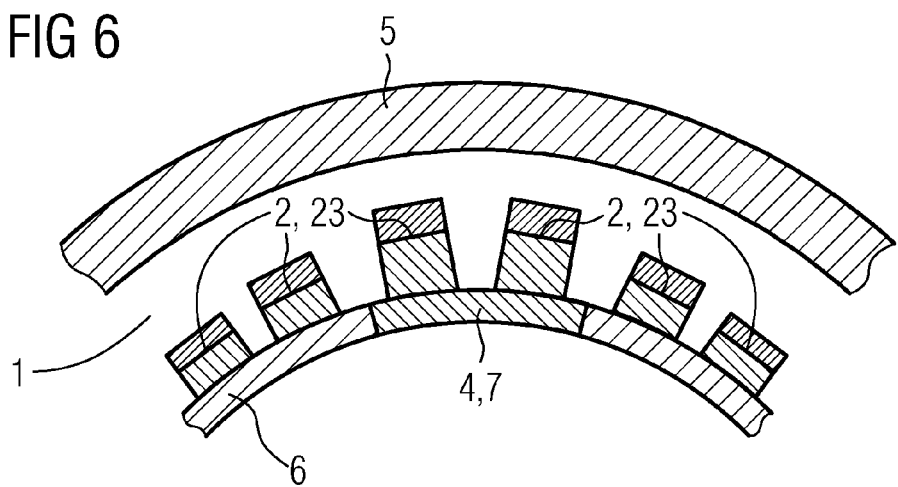

_US 8,434,692 B2_

FLOW DISTRIBUTION REGULATION ARRANGEMENT WITH BIMETALLIC ELEMENTS FOR ADJUSTING THE FLOW DISTRIBUTION IN A COOLING CHANNEL

This application is the US National Stage of International Application No. PCT/EP2007/064347, filed Dec. 20, 2007 and claims the benefit thereof. The International Application claims the benefits of European Patent Office application No. 06026683.0 EP filed Dec. 22, 2006, both of the applications are incorporated by reference herein in their entirety.

FIELD OF THE INVENTION

The invention relates to a cooling channel and improvements in the regulation of the cooling flow for increased lifetime of a gas turbine engine and for the further diminishment of air pollution such as nitrogen oxides (NOx).

BACKGROUND OF THE INVENTION

In gas turbine engines parts deal with high material temperatures making it usually necessary to provide cooling to these parts. Due to uneven heating, cooling needs to be adjusted.

Typically, a worst case map of hot-spots is established from calculations and with highly expensive experimental testing. The cooling system is designed to cope with this hot-spot map. Where the position of the hot-spot(s) is known and doesn't move significantly during operation, similar parts with varying cooling passages can be applied at the expense of standardization with effects on lead times and spares stocks.

However, the heating patterns cannot be established over all combinations of the variation of parameters, like inlet temperature and pressure, fuel type, quality and composition, or machine load, which will be experienced in service. Manufacturing variation can also lead to variation between nominally identical parts. Furthermore, service replacement and equipment wear can also change the heating patterns during the operating life of the equipment.

Therefore, robust design usually involves the use of more cooling air than is strictly necessary with impact on engine efficiency and thermal stresses between joined hotter and cooler areas of the cooled part which reduces life of the engine.

Other, dynamic approaches adjust cooling during operation relying on (failure-prone) sensors and valves with contact surfaces between parts in relative motion (subject to wear).

SU 726428 describes a device for controlling the flow as a function of the temperature of the flowing medium.

U.S. Pat. No. 2,763,433 describes L-shaped plates redirecting exhaust gas by closing and opening of an orifice as a function of the exhaust gas temperature flowing through a conduit.

U.S. Pat. No. 2,673,687 describes a so-called "duck bill" type valve for controlling and directing the flow of hot exhaust gases as a function of the temperature of the exhaust gases.

U.S. Pat. No. 4,245,778 describes a vent control arrangement for energy conservation having bimetallic damper elements mounted in a draft hood, the bimetallic damper elements having alternate bimetal reeds of different initial tension, or alternate orientations, or different flexibility.

U.S. Pat. No. 4,441,653 describes a thermally actuated damper for a furnace exhaust gas flue.

U.S. Pat. No. 6,039,262 describes a bimetallic actuator for heat transfer applications between a hot stream and a coolant stream.

SUMMARY OF THE INVENTION

An object of the invention is to provide a new cooling channel for an adjusted cooling of uneven heated parts of a gas turbine engine or other equipment dealing with high material temperatures.

This objective is achieved by a flow distribution regulation arrangement in a cooling channel, the flow distribution regulation arrangement comprising a plurality of bimetallic elements adapted to adjust a local flow of a cooling medium in the cooling channel in response to a heat load onto the bimetallic elements, wherein the heat load originates from local boundary sub areas of the cooling channel.

An inventive flow distribution regulation arrangement comprises bimetallic elements. These elements are formed from two materials with different expansion coefficients so that heating causes them to differentially bend away from or into the flow channel depending on their arrangement.

In a first advantageous embodiment, bimetallic elements are arranged on a cold wall of the cooling channel facing a hot wall of the cooling channel, the bimetallic elements reacting differentially to radiation from a hot-spot and the rest of the hot wall to divert coolant preferentially towards the hot-spot in increasing the cross-section where the hot-spot is located by bending away from the flow channel. This results in the cooling flows self-adjusting to reduce the hot-spot temperature and raise the temperature of the rest of the hot wall (usually overcooled) until the two temperatures approach each other.

Another advantageous embodiment is the use of a bimetallic element to uncover or enlarge an inlet port or ports which feed a cooling system. This may prove extremely valuable in the context of nozzle guide vane (NGV) blading cooling.

It is advantageous when an upstream end of the bimetallic elements relative to a cooling air flow is fixed to the cold wall of the cooling channel in order to constrain as little as possible the aerodynamics of the cooling flow.

An additional advantageous refinement involves limiting the thermal contact between the cold wall and bimetallic elements by using an air gap or low conductivity coating.

In a further advantageous embodiment bimetallic elements are arranged on the hot wall of a convective cooling channel to enhance coolant turbulent heat transfer preferentially towards the hotter spots. This will result in the cooling flows self-adjusting to reduce the hot-spot temperature. The movement of bimetallic strips into the convection flow in response to conduction received from the heated part has two effects. Firstly, the strips act as turbulators. The further they protrude, the higher is the turbulent heat transfer in their wake on the hot part. Secondly, due to the conduction, the strips themselves form a heat convection path to the coolant which will be more effective as they bend and protrude further into the flow.

One advantage of the inventive flow distribution regulation arrangement is the finer resolution achievable which means that the inventive cooling channel will save more air than a typical "active" control approach. This finer resolution results from the fact that multiple small elements can be applied rather than the "single valve" of other embodiments. The total cooling air in a gas turbine can be reduced with an increase in thermal efficiency of the cycle for the same maximum hot gas and material temperatures. Furthermore, if part of the cooling air which is economised is used for reducing the maximum hot gas temperature, pollutant emissions can be reduced.

Despite a finer spatial resolution than any of the adjustable prior art solutions the method of construction of the inventive flow distribution regulation arrangement is simple and efficient since it uses masking, coating and stamping, which are readily adaptable to many different sizes of parts, so the variable cooling can be made economically. The variable elements can be formed into various shapes for application to different components. For a can combustor, for instance, the coated, punched and formed sheet would be rolled into a tube for placing within the convective channel between the combustor liner and the cooling sleeve which surrounds it.

Against the prior art of using variants of similar parts for predictable varying heating environments, the inventive flow distribution regulation arrangement allows full standardization to be maintained so eliminating the possibility of misassembly and giving the usual standardization advantages of large production runs and smaller spares stocks.

Another advantage of the inventive flow distribution regulation arrangement, where a problem hot spot automatically activates the appropriate bimetallic element is the threefold increased reliability. Firstly, reducing (or even eliminating) thermal stresses between hotter and cooler areas of the same part can significantly increase part life. Secondly, avoiding contact surfaces between parts in relative motion improves reliability compared to actuator valve cooling adjustment systems. Thirdly, there is no need for a (failure-prone) sensor and control system to decide which actuator to operate and by how much.

The strips can be so designed as to lay flat against the surface in cold (non-operating) conditions so that removal is eased and the chances of accidental damage is minimized. Unlike most coolant control systems, the failure modes do not cause catastrophic failure. A first possible mode is that a strip becomes detached. If the strip is arranged on the cold side, the cross-section and the coolant flow would increase. If the strip is arranged on the hot side, this hot surface would then lie more exposed which compensates partially for the reduced cooling turbulence. A grid needs to be put at the end of the cooling channel to prevent the fugitive strips from entering the moving parts of the engine. A second possible mode is that a strip gets stuck in extended mode. If the bimetallic strip is arranged on the cold side, the surface facing that strip would then be cooled less at this point than surrounding surfaces with a life reduction similar to current practice. If the strip is arranged on the hot side, the corresponding surface is then overcooled. A third possible mode is that the strip gets stuck in down mode. If the bimetallic strip is arranged on the cold side, the surface facing that strip would then be overcooled. If the strip is arranged on the hot side, the surface would then be cooled less at this point than surrounding surfaces with a life reduction similar to current practice.

BRIEF DESCRIPTION OF THE DRAWINGS

The invention will now be further described, with reference to the accompanying drawings in which:

FIG. 3 is a sectional view of a nozzle guide vane with almost covered inlet openings;

FIG. 4 is a sectional view of a nozzle guide vane at higher temperature than in FIG. 3 with uncovered inlet openings;

FIG. 5 is a sectional view of part of a combustor can with bimetallic strips arranged on the hot side of a cooling channel;

FIG. 6 is an axial view of the combustor shown in FIG. 5;

Figure 1:
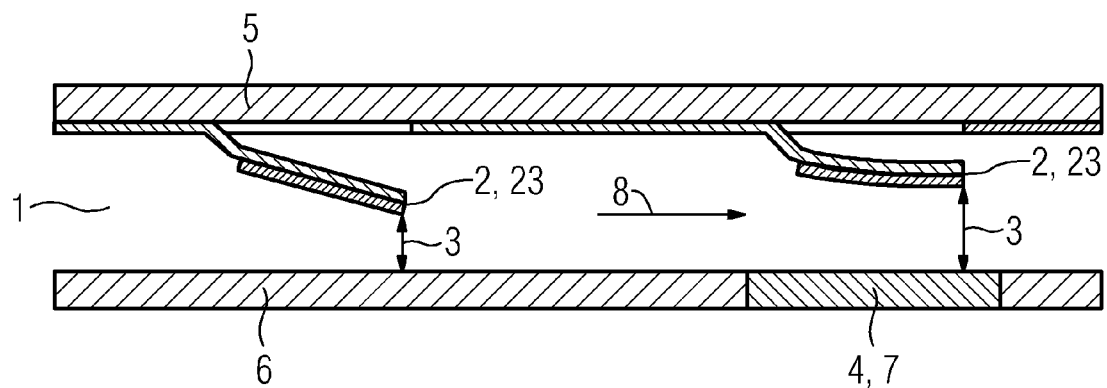
FIG. 1 is a sectional view of part of a combustor can with bimetallic strips arranged on the cold side of a flow distribution regulation arrangement in a cooling channel.

In the drawings like references identify like or equivalent parts.

DETAILED DESCRIPTION OF THE INVENTION

Referring to the drawings, FIG. 1 shows a part of a combustor can of a gas turbine engine with a flow distribution regulation arrangement in a cooling channel 1.

The cooling channel 1 is defined by a combustor liner 6 and a cooling sleeve 5 surrounding the combustor liner 6. Bimetal strips are arranged on the cold wall of the cooling sleeve 5. A local boundary sub area 4 of the combustor liner 6 is hotter than the surrounding area. The bimetal strip facing this hot spot 7 moves out of the convection air flow in response to radiation received from the hot spot 7. The cross-section 3 of the cooling channel 1 is enlarged relative to colder sub areas like on the left hand side of FIG. 1 and the amount of on-rushing cooling air is increased.

Figure 2:
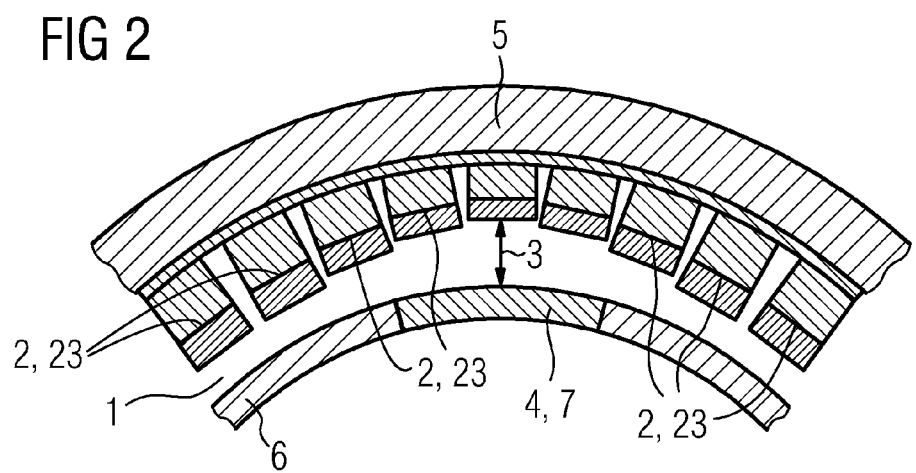
FIG. 2 is an axial view of the combustor shown in FIG. 1.

FIG. 2 shows a different view on the flow distribution regulation arrangement in a combustor can. Looking in the axial direction of the combustor can is best to describe the functional principle of the inventive flow distribution regulation arrangement in a cooling channel 1. The bimetal strips facing a hot spot 7 move out of the convection air flow in response to the radiation received. Coolant flow is diverted preferentially to the hot spot 7 increasing the throughput of coolant to reduce the hot spot 7 temperature while the rest of the hot wall is cooled less.

FIG. 3 shows a section through a nozzle guide vane 9 (NGV) comprising a leading edge 15, a trailing edge 16 with openings 24, a first part of a coolant metering plate 11 with first openings 12 and a bimetal strip 23 close to the leading edge 15 anchored at one end (anchor point 17) and having a second part of a metering plate 13 with second openings 14 at the far end. The first and second openings 12,14 of the first and second parts of metering plates 11,13 hardly overlap, so that the inlet port 10 is almost closed. Only a little cooling air can enter the nozzle guide vane 9 and exhaust from the trailing edge 16.

The hottest part of the nozzle guide vane 9 is typically the leading edge 15. FIG. 4 shows a bimetal strip 23 bending towards the leading edge 15 due to increased temperature radiation received from the leading edge 15, thereby sliding the second part of the metering plate 13 to the left and increasing the overlap of first and second openings 12,14 of the first and second parts of the metering plate 11,13 to let more cooling air enter the nozzle guide vane 9. The hotter a nozzle guide vane 9, the larger the coolant flow 8, thus equalizing the temperature of all similar nozzle guide vanes 9 on a ring.

FIG. 5 shows part of a convective channel between a combustor liner 6 and a cooling sleeve 5 which surrounds it. Bimetallic elements 2 of a flow distribution regulation arrangement are arranged with their downstream end relative to a coolant flow on the hot side, i.e. on the combustor liner 6 and protrude into the convective cooling channel 1. The bimetallic element 2 in the centre is in "normal" position. The left-most bimetallic element 2 is in "hot" position and protrudes deeper into the cooling channel 1 thereby inducing more coolant turbulence and thus additional heat conduction and convection over the hot spot 7. The right-most bimetallic element 2 is in "cold" position where it hardly protrudes into the cooling channel 1 thereby reducing the coolant convective heat transfer over the "cold" spot.

FIG. 6 shows the same arrangement as FIG. 5 with a different perspective looking along an axial direction of the combustor can. The bimetal strips at hot spots 7 move into the convection air flow in response to the radiation received, thus increasing the turbulence and heat conduction over the hot spot 7.

Figure 7:
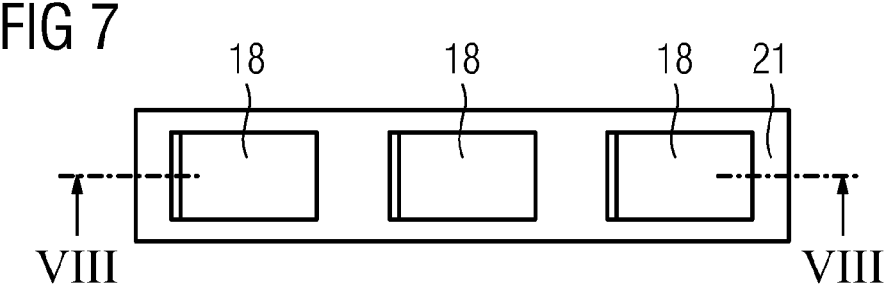
FIGS. 7 to 18 show the process of manufacture by coating.
Figure 8:
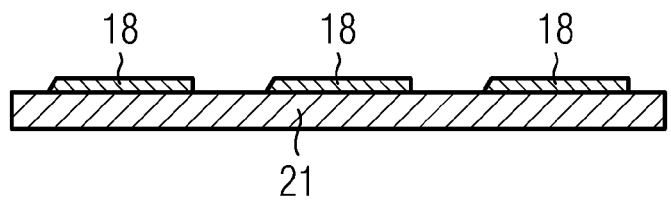
Figure 9:
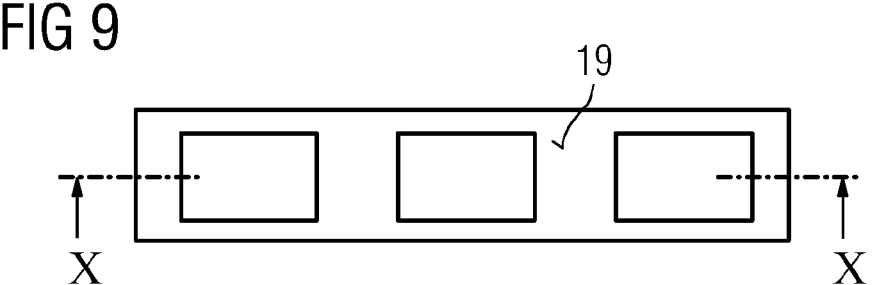
Figure 10:
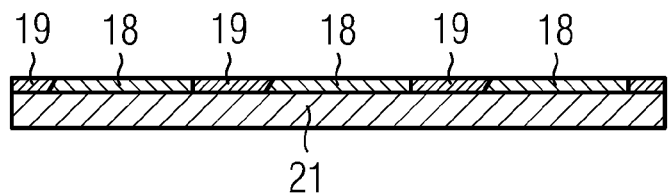
Figure 11:
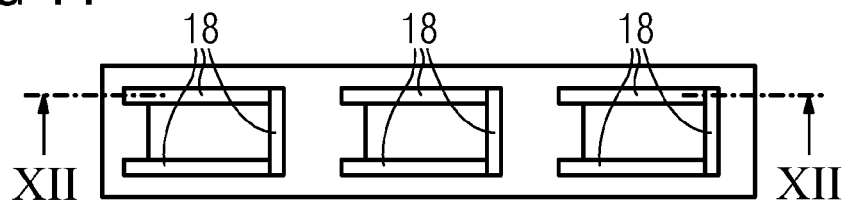
Figure 12:
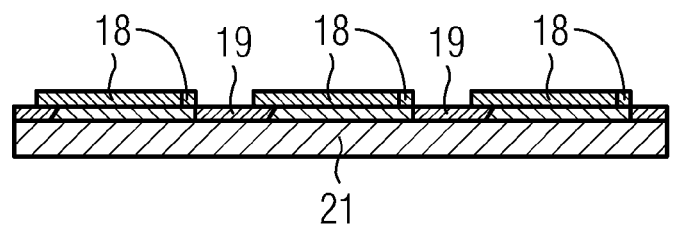
Figure 13:
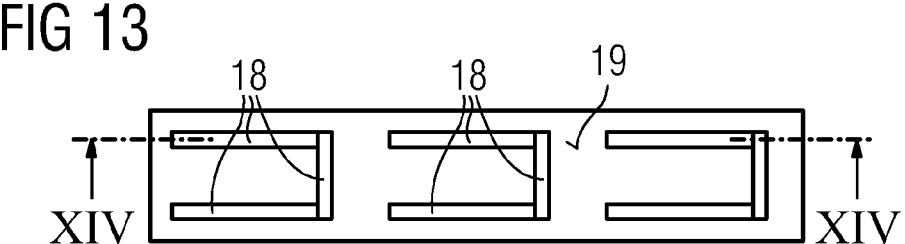
Figure 14:
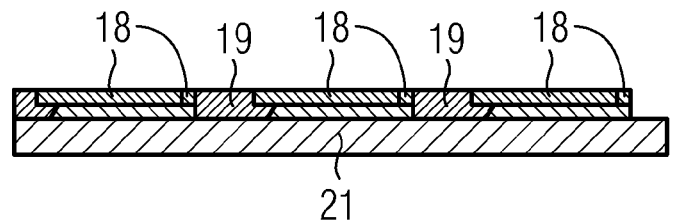
Figure 15:
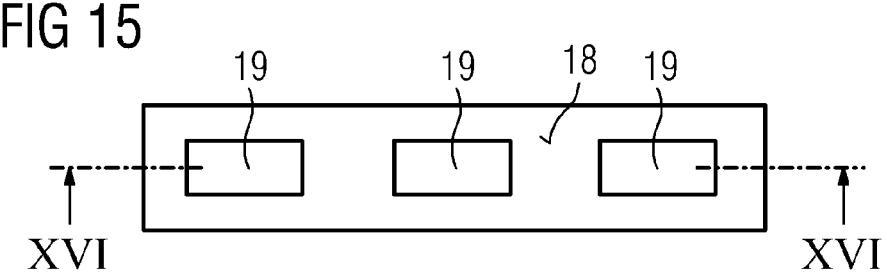
Figure 16:
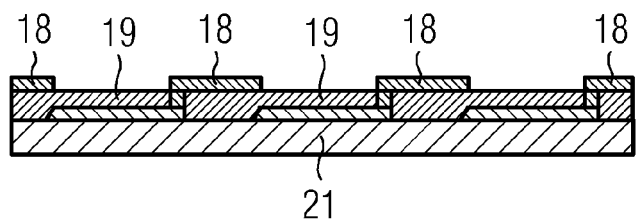
Figure 17:
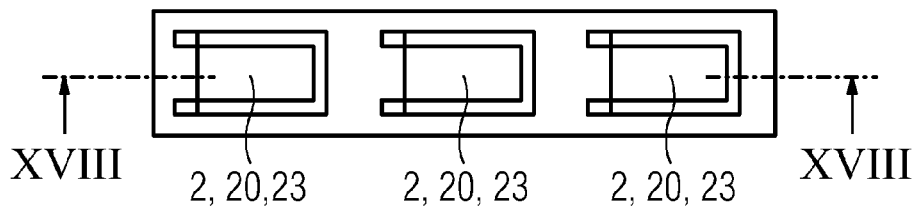
Figure 18:
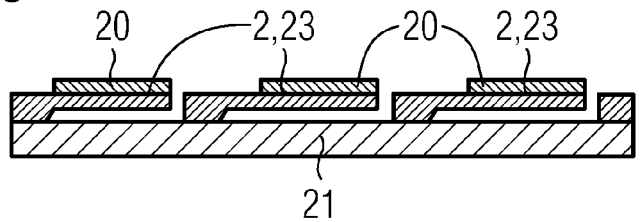

FIGS. 7 to 18 show the process of manufacturing a part of a flow distribution regulation arrangement in a cooling channel 1 supporting bimetallic elements 2 as a coating on a shell 21. Figures with even numbers are side views on shells 21 cut along the indicated dashed-dotted lines shown in the respective preceding Figures. FIGS. 7 and 8 show the masking of areas where the bimetallic strips 23 shall detach from the shell 21. FIGS. 9 and 10 show the shell 21 after a first coating with a base material 19. FIGS. 11 and 12 show the arrangement of second masks 18 on top of the first masks 18 along three edges of the first masks 18 to allow the formation of strips in the next step shown in FIGS. 13 and 14, where again base material 19 is applied. After this, a mask 18 with cut-outs for the second material of the bimetallic strips 23 is applied as shown in FIGS. 15 and 16. Once the second material of the bimetallic strips 23 has been applied, the masks 18 are dissolved to release the bimetallic strips 23. The end-product is shown in FIGS. 17 and 18.

Figure 19:
FIGS. 19 to 23 show the process of manufacture by fabricating.
Figure 20:
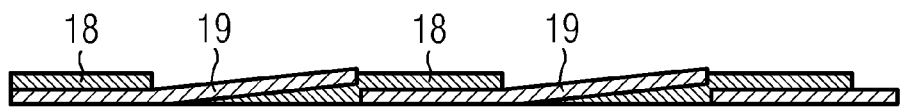
Figure 21:
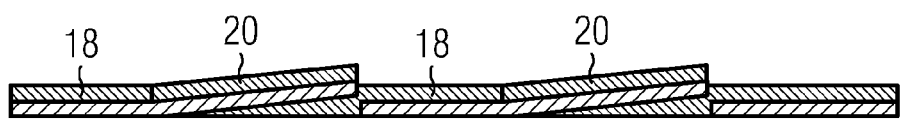
Figure 22:
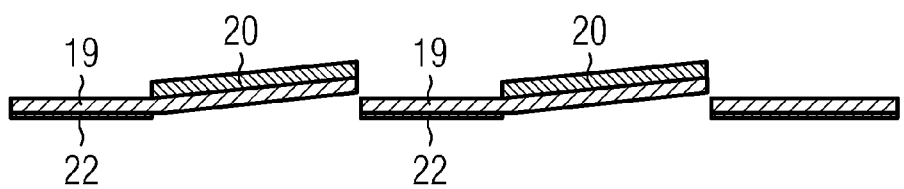
Figure 23:
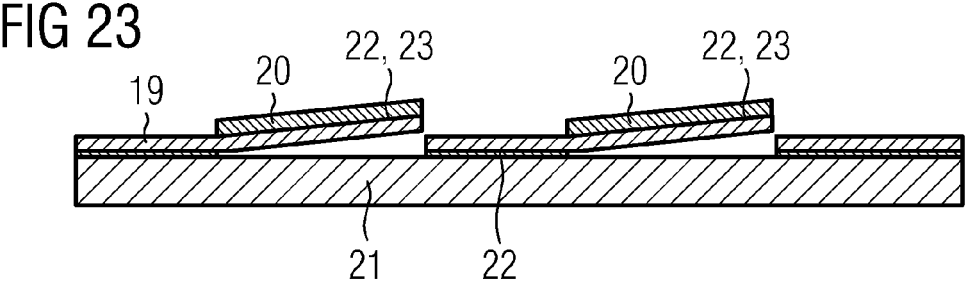

The strips can alternatively be formed by masking, coating and stamping a separate substrate layer which is then welded or brazed to a part of the gas turbine engine, for instance a shell 21, at suitable points as shown in FIGS. 19 to 23. This has the advantage that the bimetallic strips 23 and the mentioned part of the gas turbine engine can be manufactured in parallel, reducing lead time, and may permit a more robust bimetallic strip 23. The masking and coating sequence is also simplified compared to the procedure shown in FIGS. 7 to 18. FIG. 19 shows a stamped out strip pattern in a substrate. The substrate is then masked 18 on both sides as shown in FIG. 20. On one side a second part 20 of the material for bimetallic elements 2 is applied as shown in FIG. 21. On the other side, a braze material 22 is applied. FIG. 22 shows the result after having resolved the masks 18. The substrate is then brazed together with a shell 21 as shown in FIG. 23.

What is claimed is:

1. A flow distribution regulation arrangement in a cooling channel, the flow distribution regulation arrangement, comprising:
    a bimetallic element,
    wherein the of bimetallic element is adapted to adjust a local flow of a cooling medium in the cooling channel in response to a heat load onto the of bimetallic element, and
    wherein the heat load originates from a local boundary sub area of the cooling channel,
    wherein the local boundary sub area is a hot spot,
    wherein the hot spot is located on a combustor liner of a gas turbine engine.

2. The flow distribution regulation arrangement as claimed in claim 1, wherein the bimetallic element is a bimetallic strip.

3. The flow distribution regulation arrangement as claimed in claim 1, wherein the bimetallic element is adapted to adjust a rate of the local flow by adjusting a local effective cross-section which is a cross-section of the cooling channel at a position in the cooling channel.

4. The flow distribution regulation arrangement as claimed in claim 3, wherein the local effective cross-section increases with a temperature increase of the local boundary sub area.

5. The flow distribution regulation arrangement as claimed in claim 1, wherein the bimetallic element is arranged on a cold side of a cooling channel.

6. The flow distribution regulation arrangement as claimed in claim 5, wherein the cold side is a confining wall.

7. The flow distribution regulation arrangement as claimed in claim 6, wherein the confining wall surrounds the combustor liner of a gas turbine engine.

8. The flow distribution regulation arrangement as claimed in claim 1, wherein an upstream end of the bimetallic element relative to a local flow is fixed to the cooling channel.

9. The flow distribution regulation arrangement as claimed in claim 1, wherein the bimetallic element is adapted to adjust a turbulence of the local flow.

10. The flow distribution regulation arrangement as claimed in claim 1, wherein the bimetallic element is attached to a hot side of the cooling channel.

11. The flow distribution regulation arrangement as claimed in claim 10, wherein the hot side is the combustor liner.

12. The flow distribution regulation arrangement as claimed in claim 1, wherein a downstream end of the bimetallic element relative to the local flow is fixed to the cooling channel.

13. The flow distribution regulation arrangement as claimed in claim 1, wherein an extension of the bimetallic element into the local flow increases with the temperature increase of the local boundary sub area.

14. The flow distribution regulation arrangement as claimed in claim 1, wherein the bimetallic element is foamed from two materials, each material having a different expansion coefficient.

15. The flow distribution regulation arrangement as claimed in claim 1, wherein the bimetallic element is used to uncover an inlet port feeding a cooling system.

16. The flow distribution regulation arrangement as claimed in claim 1, wherein the bimetallic element is used to enlarge the inlet port feeding the cooling system.

17. The flow distribution regulation arrangement as claimed in claim 1, wherein an air gap is used to limit a thermal contact between the cold wall and the bimetallic element.

18. The flow distribution regulation arrangement as claimed in claim 1, wherein a low conductivity coating is used to limit the thermal contact between the cold wall and the bimetallic element.

* * * * *